(12) United States Patent
Dong

(10) Patent No.: US 11,688,200 B2
(45) Date of Patent: Jun. 27, 2023

(54) JOINT FACIAL FEATURE EXTRACTION AND FACIAL IMAGE QUALITY ESTIMATION USING A DEEP NEURAL NETWORK (DNN) TRAINED WITH A CUSTOM-LABELED TRAINING DATASET AND HAVING A COMMON DNN BACKBONE

(71) Applicant: Fortinet, Inc., Sunnyvale, CA (US)

(72) Inventor: Xihua Dong, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 225 days.

(21) Appl. No.: 17/135,867

(22) Filed: Dec. 28, 2020

(65) Prior Publication Data

US 2022/0207260 A1 Jun. 30, 2022

(51) Int. Cl.
| | |
|---|---|
| *G06V 40/16* | (2022.01) |
| *G06N 3/08* | (2023.01) |
| *G06T 7/00* | (2017.01) |
| *G06V 20/52* | (2022.01) |
| *G06F 18/214* | (2023.01) |

(52) U.S. Cl.
CPC .......... *G06V 40/168* (2022.01); *G06F 18/214* (2023.01); *G06N 3/08* (2013.01); *G06T 7/0002* (2013.01); *G06V 20/52* (2022.01); *G06V 40/172* (2022.01)

(58) Field of Classification Search
None
See application file for complete search history.

(56) References Cited

U.S. PATENT DOCUMENTS

| | | | |
|---|---|---|---|
| 10,445,881 B2 * | 10/2019 | Spizhevoy | ........... G06V 10/993 |
| 2018/0352150 A1 * | 12/2018 | Purwar | .................. H04N 5/445 |
| 2019/0213474 A1 * | 7/2019 | Lin | ...................... G06V 40/171 |
| 2019/0295223 A1 * | 9/2019 | Shen | ..................... G06T 7/0002 |

* cited by examiner

*Primary Examiner* — Leon Viet Q Nguyen
(74) *Attorney, Agent, or Firm* — HDC Intellectual Property Law, LLP

(57) ABSTRACT

Systems and methods for joint feature extraction and quality prediction using a shared machine learning model backbone and a customized training dataset are provided. According to an embodiment, a computer system receives a training dataset including example images each labeled with a particular category of a set of categories, and trains a deep neural network (DNN) based on the training dataset to jointly perform for an input image (i) facial feature extraction in accordance with the facial feature extraction algorithm and (ii) a quality scoring in accordance with a quality prediction algorithm. In the embodiment, the DNN, once trained with the training dataset labeled using a custom labeling scheme is used for the facial feature extraction and the quality prediction. The facial feature extraction algorithm and the quality prediction algorithm share a common DNN backbone of the DNN.

20 Claims, 12 Drawing Sheets

| SCORE | DESCRIPTION | EXAMPLES |
|---|---|---|
| 0 | NON-FACE | |
| 1 | UNRECOGNIZABLE, EVEN FOR FAMILIAR PERSONS | |
| 2 | SEVERELY BLURRED, BUT STILL RECOGNIZED OR DIFFERENTIATED BY FAMILIAR PERSONS | |
| 3 | BLURRED OR LOW RESOLUTION, CAN BE RECOGNIZED OR DIFFERENTIATED BY UNFAMILIAR PERSONS | |
| 4 | MINOR BLURRED, ILL-POSED (PITCH > 45 DEGREE OR ROLL > 45 DEGREE OR YAW > 45 DEGREE) | |
| 5 | SHARP, CLEAR AND GOOD-POSED (PITCH <= 45 DEGREE AND ROLL <= 45 DEGREE AND YAW <= 45 DEGREE) | |

FIG. 7

JOINT FACIAL FEATURE EXTRACTION AND FACIAL IMAGE QUALITY ESTIMATION USING A DEEP NEURAL NETWORK (DNN) TRAINED WITH A CUSTOM-LABELED TRAINING DATASET AND HAVING A COMMON DNN BACKBONE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present disclosure generally relate to facial recognition and facial image quality prediction. In particular, embodiments of the present disclosure relate to joint feature extraction and quality prediction using a shared machine learning model backbone and a custom-labeled training dataset.

Description of the Related Art

Facial recognition systems, also referred to as face recognition systems, provide the capability to computing devices to match a human face captured in an image or video feed against a database of faces. In face recognition (FR) systems, facial features are used to perform matching operations to differentiate one person from others. Advance machine learning models, such as Deep Neural Networks (DNNs), may be used to compute the facial features. For example, FaceNet, one of the widely used DNNs, extracts features from an image and outputs a 512×1 feature vector. This feature vector is referred to as an "embedding" as the information of interest from the processed image is embedded within the feature vector.

SUMMARY

Systems and methods are described for joint feature extraction and quality prediction using a shared machine learning model backbone and a custom-labeled training dataset. According to an embodiment, a deep neural network (DNN) is provided that implements a facial feature extraction algorithm and a quality prediction algorithm that share a common DNN backbone of the DNN. The DNN is trained to jointly perform (i) facial feature extraction in accordance with the facial feature extraction algorithm and (ii) a quality score in accordance with the quality prediction algorithm by: (i) training the common DNN backbone and the facial feature extraction algorithm based a first training dataset including multiple training images; and (ii) training the quality prediction algorithm based a second training dataset while holding fixed the common DNN backbone, wherein the second training dataset includes example images each labeled with a score value associated with a particular category of multiple categories, wherein a first category of the multiple categories includes a first subset of the example images representative of those of the example images for which a facial feature extraction algorithm cannot be performed, wherein a second category of the multiple categories includes a second subset of the example images representative of those of the example images that are ideal for the facial feature extraction algorithm, and wherein a third category of the multiple categories includes a third subset of the example images representative of those of the example images having a suitability for the facial feature extraction algorithm between that of the first category and the second category.

According to another embodiment, inference processing is performed. An image is received. A suitability of the image for performing a facial feature extraction algorithm on the image is determined by performing a quality prediction algorithm on the image. When the suitability is greater than a predetermined quality threshold, facial features are extracted from a face contained within the image by applying the facial feature extraction algorithm. The quality prediction algorithm and the facial feature extraction algorithm are jointly performed by a DNN that has been trained based on a training dataset including example images each labelled with a score value associated with a particular category of multiple categories. The facial feature extraction algorithm and the quality prediction algorithm share a common DNN backbone of the DNN. A first category of the multiple categories includes a first subset of the example images representative of those of the example images for which the facial feature extraction algorithm cannot be performed. A second category of the multiple categories includes a second subset of the example images representative of those of the example images that are ideal for the facial feature extraction algorithm. A third category of the multiple categories includes a third subset of the example images representative of those of the example images having a suitability for the facial feature extraction algorithm between that of the first category and the second category.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

FIG. 7 illustrates a custom labeling scheme 700 that may be used to tag a custom training dataset in accordance with an embodiment of the present disclosure.

DETAILED DESCRIPTION

Systems and methods are described for joint feature extraction and quality prediction using a shared machine learning model backbone and independent training datasets. Low facial quality images may reduce the accuracy of FR systems. As such, prior to performing facial recognition on a face image, a quality score may first be generated for the face image to predict the suitability of the face image for facial recognition. In surveillance systems, facial image quality is of particular concern as many images captured by such systems may have characteristics (e.g., blurred, ill-posed, and the like) that make them unsuitable for facial recognition.

Figure 4A:
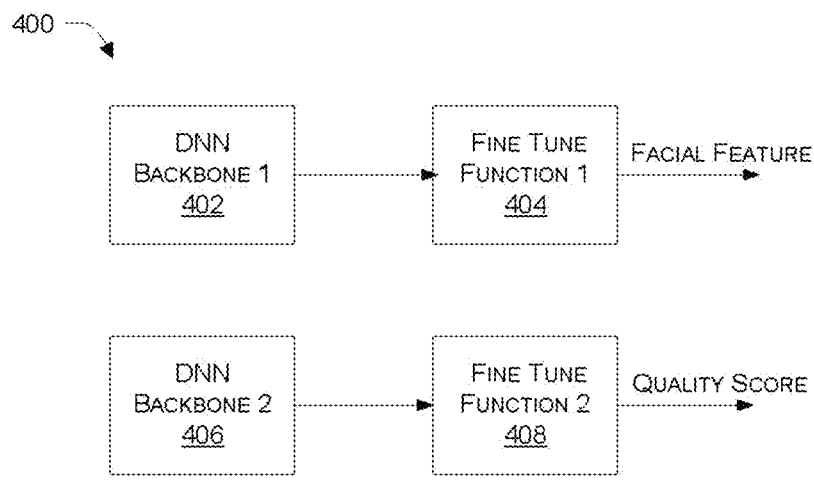
FIG. 4A illustrates a traditional approach for performing facial feature extraction and quality prediction using multiple DNN backbones.

As illustrated with reference to FIG. 4A, existing facial quality prediction algorithms have various drawbacks. FIG. 4A illustrates a traditional approach DNN architecture 400 for performing facial feature extraction (e.g., FaceNet) and quality prediction (e.g., FaceQNet) using multiple DNN backbones 402 and 406. As shown in FIG. 4A, traditional facial recognition systems use a first DNN backbone (e.g., DNN backbone 1 402) and other fine-tuned functions (e.g., fine-tune function 1 404) for facial feature extraction and a second DNN backbone (e.g., DNN backbone 2 406) and fine-fined function (e.g., fine-tune function 2 408) for quality prediction. The DNN backbone-1 402 and DNN backbone-2 406 are trained for a specific application, e.g., one for facial feature extraction one for quality score prediction and the output of the first DNN is used to align the second DNN. This approach is more complex and requires more computational resources than need be. For example, FaceQNet makes use of an independent DNN backbone in addition to the DNN backbone used by the target FR system (e.g., FaceNet), which increases the system complexity. FaceQNet also suffers from imprecise quality scoring as a result of training its DNN backbone (e.g., DNN Backbone 2 406) with features extracted by the target FR system (e.g., FaceNet).

Embodiments of the present disclosure seek to address various limitations of existing facial quality prediction algorithms, for example, by performing joint feature extraction and quality prediction using a shared machine learning model backbone and a custom-labeled training dataset.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

In the following description, numerous specific details are set forth in order to provide a thorough understanding of example embodiments. It will be apparent, however, to one skilled in the art that embodiments described herein may be practiced without some of these specific details Terminology Brief definitions of terms used throughout this application are given below.

The terms "connected" or "coupled" and related terms are used in an operational sense and are not necessarily limited to a direct connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "surveillance system" or a "video surveillance system" generally refers to a system including one or more video cameras coupled to a network. The audio and/or video captured by the video cameras may be live monitored and/or transmitted to a central location for recording, storage, and/or analysis. In some embodiments, a network security appliance may perform video analytics on video captured by a surveillance system and may be considered to be part of the surveillance system.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides one or more security functions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPsec), TLS, SSL), application control, Voice over Internet Protocol (VoIP) support, Virtual Private Networking (VPN), data leak prevention (DLP), anti spam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), and DoS attack detection appliances (e.g., the FORTIDDOS family of DoS attack detection and mitigation appliances).

Figure 1A:
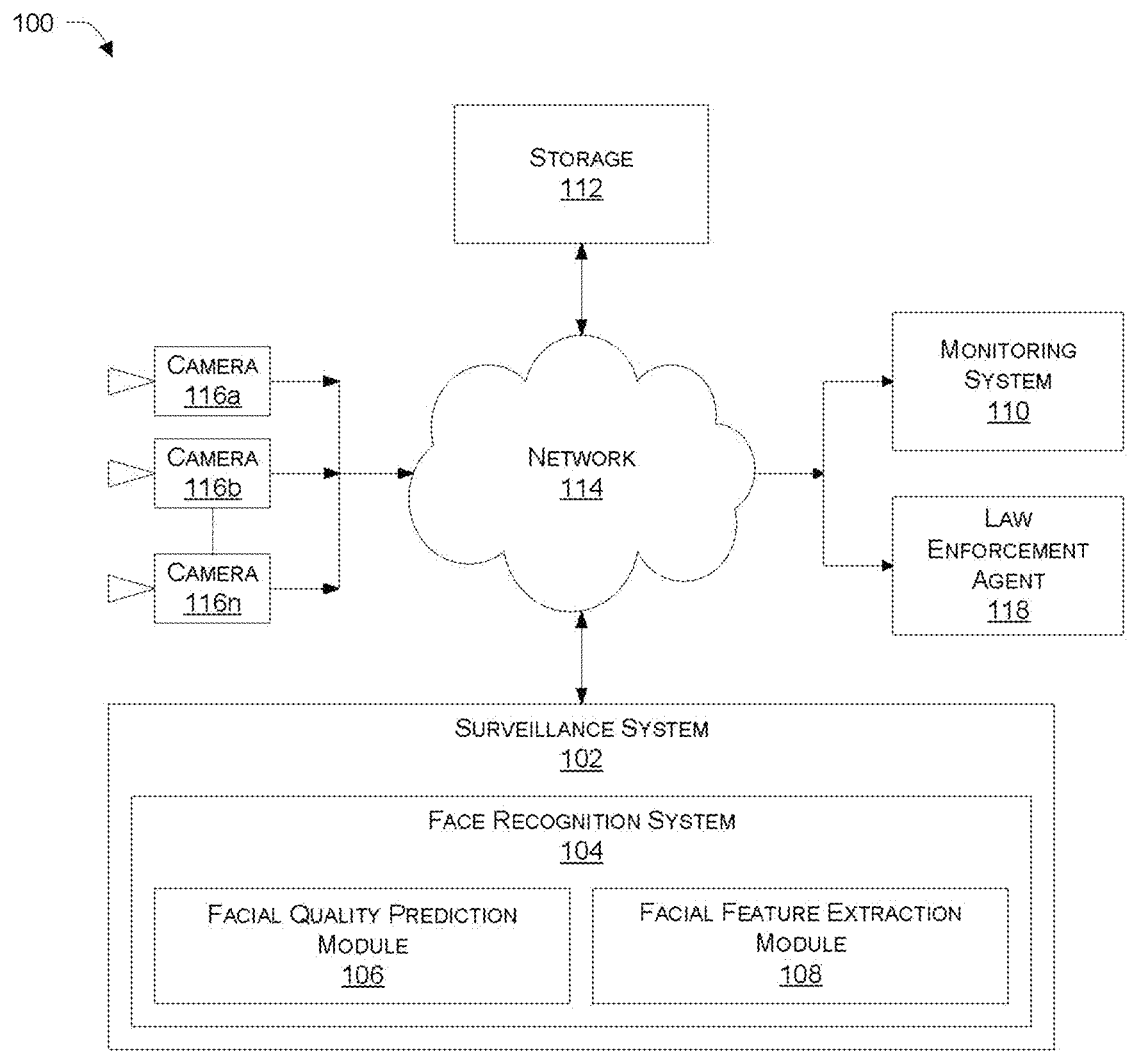
FIG. 1A illustrates an example network environment in which a face recognition system is deployed in accordance with an embodiment of the present disclosure.

FIG. 1A illustrates an example network environment 100 in which a face recognition system 104 is deployed in accordance with an embodiment of the present disclosure. In the context of the present example, a surveillance system 102 receives video feeds (also referred to as video frames) from one or more cameras (e.g., cameras 116a-n) installed at different locations. The cameras 116a-n may deliver high-resolution video frames (e.g., 1280×720, 1920×1080, 2560×1440, 2048×1536, 3840×2160, 4520×2540, 4096×3072 pixels, etc.) via a network 114 with high frame rates. The video frames captured from the cameras 116a-n may be input into the face recognition system 104. Different entities, such as camera 116a-n, surveillance system 102, and monitoring system 110, devices of law enforcement agent 118, storage 112 may be on different computing devices connected through network 114, which may be a LAN, WAN, MAN, or the Internet. Network 114 may include one or more wired and wireless networks and/or connection of networks. The video feeds received from each of these cameras may be analyzed to recognize human faces.

According to one embodiment, the face recognition system 104 analyzes the video feeds or images to recognize human faces using a machine learning model. While in the context of the present example, the face recognition system 104 is shown as part of the surveillance system 104, it may be an independent system that receives an input image and recognizes a human face present in the image. The face recognition system 104 may alternatively be integrated with other security control systems, such as physical security control systems and other facial recognition-based authentication systems. Those skilled in the art will recognize there are various other use cases and systems in which or with which the face recognition system 104 may be integrated.

The face recognition system 104 may be designed using a Deep Neural Network (DNN) machine learning model to recognize human faces in the video feeds or an image. In the context of the present example, the face recognition system 104 includes a facial quality prediction module 106 and a facial feature extraction module 108. The facial quality prediction module 106 is operable to predict the suitability of an image for performing facial feature extraction. The facial feature extraction module 108 is operable to extract facial features from the image. As described further below with reference to FIG. 3, the facial quality prediction module 106 may provide a predicted score indicative of the suitability of an image for face recognition. For example, the prediction score may be generated based on a scale of 0 to 100, inclusive, in which 0 indicates the least suitable and 100 indicates the most suitable image for face recognition. In various embodiments described herein, when the facial quality score generated by the facial quality prediction module 106 is greater than a predefined or configurable threshold (e.g., 50) for an image at issue, then the facial feature extraction module 108 may be used to perform facial feature extraction from the image at issue, and the extracted features may be used to recognize a human face from the image at issue.

As described further below with reference to FIG. 4B, a DNN having a common DNN backbone may be trained for both facial feature extraction and face quality prediction by first training the DNN backbone for facial feature extraction and then fixing the DNN backbone and training a facial image quality prediction branch with a customized training dataset (e.g., a training dataset having customized labels representing an image's suitability for performing facial recognition). In this manner, the intermediate output of the DNN backbone (which also serves as the input to the facial image quality prediction branch) is highly correlated with features that are useful for either face recognition and/or facial image quality prediction.

According to one embodiment, when the predicted facial quality is less than the threshold value, the facial feature extraction module 108 may terminate its operation, and the image at issue may be discarded as not suitable for facial recognition. In an embodiment, the face recognition system 104 may display an indicator that the image is not suitable. Depending upon the particular implementation, the face recognition system 104 may provide active feedback to camera 116a-n to adjust its setting or request a new image. In an embodiment, if the predicted facial quality of the image is equal or greater than the threshold, the facial features extraction module 108 continues with the process of extraction of facial features and uses those for face recognition. The surveillance system 102 may match the facial feature extracted from an input image with a local image database or with an image database maintained at a network storage 112. Responsive to recognition of a face, one or more other systems may be notified. For example, if the surveillance system 102 detects a face that matches a face associated with a person of interest, for example, in a lookout database, the surveillance system 102 may send a notification to the law enforcement agent 118. The recognized face can also be highlighted, and metadata (such as information indicative of a person's identify) associated with the recognized face can also be attached. The image or video feeds with the attached metadata can be provided to the monitoring system 110 or the law enforcement agent 118.

As those skilled in the art will appreciate, while face recognition system 104 is described in the context of human face recognition, the methodologies described herein may be useful to object recognition more generally. As such, an object recognition system can similarly be designed with an object quality prediction module and an object feature extraction module, and both configured to use a common DNN backbone. For example, the DNN may be trained to recognize a specific object type; and instead of predicting a score for suitability for facial detection, which looks for a face, the object quality prediction module can be trained to output a score indicative of the quality of an image at issue for extracting features associated with the object type at issue. Similarly, the object feature extraction module may be trained for extracting features specific to the particular object type. Depending upon the particular implementation, the face recognition system 104 may use local compute and/or storage resource or cloud resources for predicting facial quality and extracting facial features using DNN.

Figure 1B:
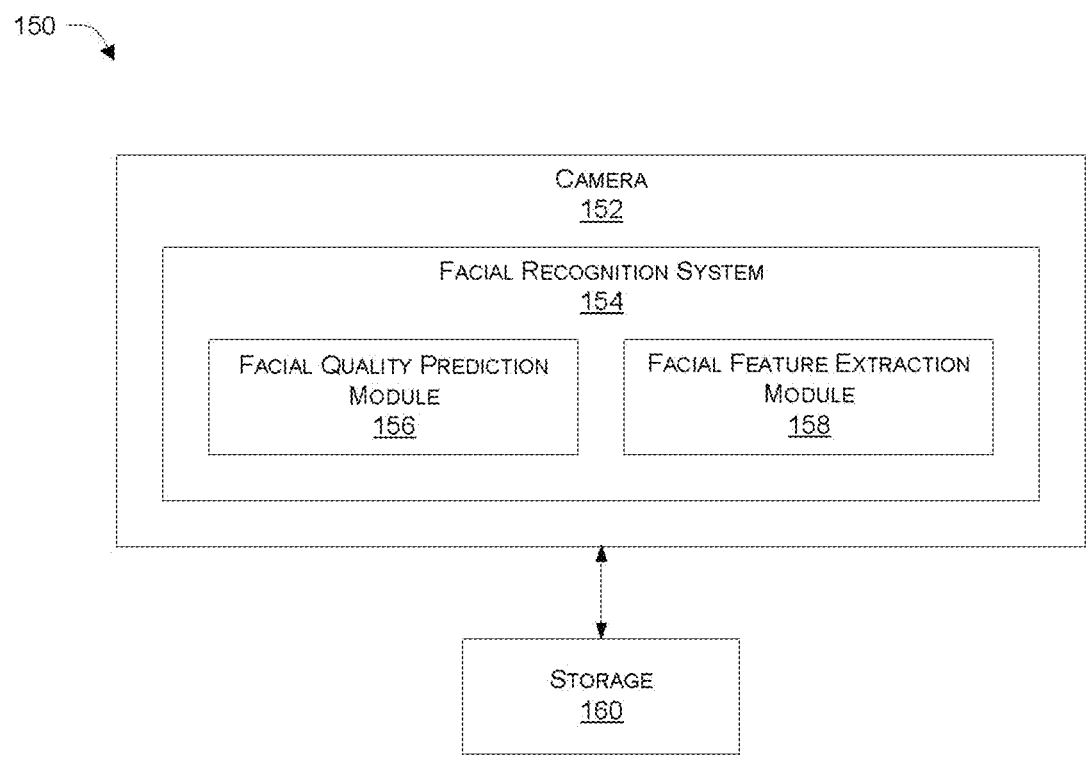
FIG. 1B illustrates an example deployment of a face detection system in accordance with an embodiment of the present disclosure.

FIG. 1B illustrates the deployment of a face recognition system 154 in accordance with an embodiment of the present disclosure. As shown in FIG. 1B, the facial recognition system 154 may be integrated with a camera 122 (or other edge device). The system 154 may store the video feeds received from the integrated camera and perform the facial recognition locally. The system 154 may include local storage 160 or use cloud storage infrastructure connected through a network (e.g., network 114) for storing the video feeds. The camera 162 may upload raw videos and analyzed video feeds on in storage 160. Camera 162 may be operable to locally perform face recognition using the teachings of present disclosure. The camera may be a CCTV camera, or a handheld imaging device, or an Internet of Things (IoT) device, or a mobile phone integrated camera that captures video. Videos captured by the camera 162 can be analyzed by the face detection system 154 to detect a human face and recognize the face. In this example, camera 162 is operable to perform a majority of processing locally and recognize a face even when not connected to a network.

In the context of the present example, the facial recognition system 154 may be optimized for edge computing. Responsive to receiving an image or a video frame from the camera 152, the facial recognition system 154 a DNN (upon which a facial quality prediction module 156 and a facial feature extraction module 158 are based) to predict facial quality and extract facial features for recognizing a human face, respectively, in the image or video frame.

Figure 2:
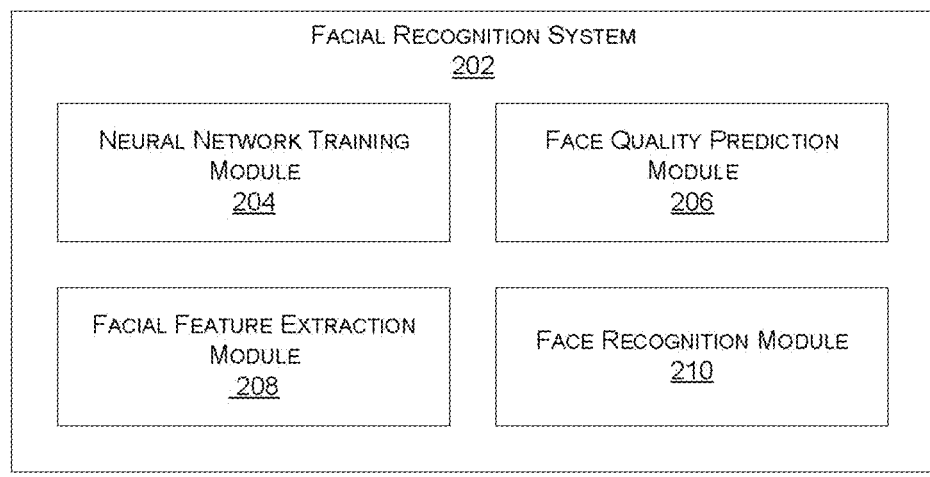
FIG. 2 illustrates functional modules of a facial recognition system in accordance with an embodiment of the present disclosure.

FIG. 2 illustrates functional modules of a facial recognition system in accordance with an embodiment of the present disclosure. The facial recognition system 202 includes a neural network training module 204, a face quality prediction module 206, a facial feature extraction module 208, and a face recognition module 210. The neural network training module 204 may be operable to train a DNN for facial recognition using a custom-labeled dataset. The face quality prediction module 206 may be operable to predict the suitability of a received image for facial recognition. The facial feature extraction module 208 may be operable to extract facial features from the image. The face recognition module 210 may be operable to compare the facial features extracted from the image with facial features of human faces stored in a database.

As described in further detail below with reference to FIG. 7, in an embodiment, the neural network training module 204 receives a custom-labeled training dataset that includes labeled images classified into a set of categories each having a different level of suitability (e.g., a quality score) for use in connection with performing facial recognition. The custom-labeled training dataset may include example images, each associated with a particular category of the set of categories and tagged with a score indicative of their respective quality score. Module 204 trains a deep neural network (DNN) to jointly perform facial feature extraction in accordance with the facial feature extraction algorithm and a quality scoring in accordance with a quality prediction algorithm.

According to one embodiment, module 204 may first train the DNN for facial feature extraction on a first training dataset. After the DNN has been trained for facial feature extraction, the DNN backbone can be fixed. Module 204 may then further train the facial image quality prediction branch of the DNN with the custom-labeled training dataset. In this manner, the training is designed in such a way that the intermediate output of the DNN backbone (which also serves as the input to the facial image quality prediction branch) is highly correlated with features that are good for either face recognition or facial image quality prediction.

As described in further detail below with reference to FIG. 7, in an embodiment, the custom-labeled training dataset may include multiple categorizes of example/training images. For example, a first category may include a first subset of the training images representative of those of the training images for which a facial feature extraction algorithm cannot be performed as there is no face contained within these images. This first category may be referred to as non-face images and may be associated with the lowest possible quality score. A second category may include a second subset of the training images representative of those of the example images that are ideal for the facial feature extraction algorithm. The second category may be associated with the highest possible quality score. A third category may include a third subset of the training images representative of those of the training images having suitability for the facial feature extraction algorithm between that of the first category and the second category and tagged with a quality score between that o the first category and the second category. As described further below, the training images of the third category can be further subdivided into additional sub-categories.

In the embodiment, the DNN, once trained with the custom-labeled training dataset labeled with scores as described herein, may be used to jointly perform facial feature extraction and quality prediction based on a shared DNN backbone of the DNN.

In an embodiment, the face quality prediction module 206 receives an image and predicts the suitability of the image for performing a facial feature extraction algorithm on the image by performing a quality prediction algorithm on the image. The face quality prediction module 206 may output a quality score for a given image in a range of 0 to 100, inclusive, in which 0 is indicative of an image perceived to not containing a human face and in which 100 is indicative of the image containing a face that is sharp, clear, and suitably posed. As those skilled in the art will appreciate, the face quality prediction module 206 may use other numerical ranges (e.g., a floating point number between 0 and 1, inclusive, or an integer value between 0 and 10, inclusive) to represent its prediction scores. The face quality prediction module 206 may use initial layers of DNN as a backbone, and downstream layers and branches of the DNN may be customized for facial quality prediction.

In an embodiment, the facial feature extraction module 208 uses a DNN having a common DNN backbone and downstream layers and branches for quality score prediction and or for feature extraction. The facial feature extraction module 208 may use a suitable facial feature extraction algorithm and custom parameters for extracting facial features. The backbone and specific branches of the DNN may be trained for any facial feature extraction algorithm. As described further below, the DNN may be used to jointly extract facial features and generate a face quality prediction score for an image at issue. In various embodiments, when it is determined that the facial quality score for the image at issue is greater than or equal to a threshold (meaning the image is suitable for face recognition), all available facial features are extracted from the image by the facial feature extraction module 208; otherwise, the image may be discarded and facial feature extraction may be skipped.

The face recognition module 210 is operable to make use of the features extracted by the facial feature extraction module 208 to recognize the face present in the image. In an embodiment, the layers of the DNN can be used to match the face present in the image with target faces available in an image database. In an embodiment, other machine learning models and image matching models may be used for matching the extracted features to recognize the face present in the image.

Figure 3:
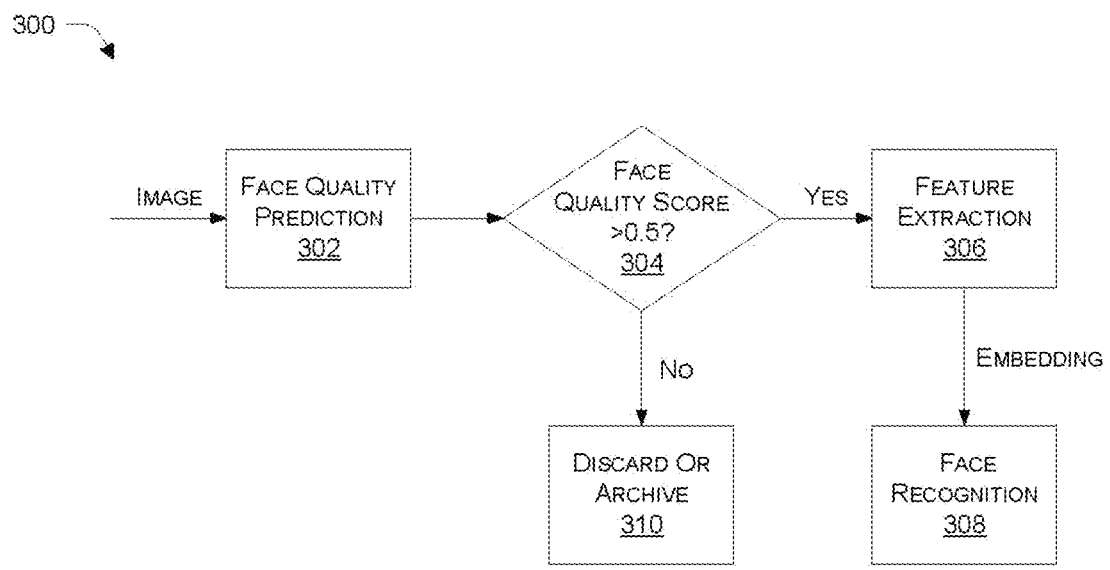
FIG. 3 is a flow diagram illustrating face quality prediction and facial feature extraction processing in accordance with an embodiment of the present disclosure.

FIG. 3 is a flow diagram illustrating face quality prediction and facial feature extraction processing in accordance with an embodiment of the present disclosure. In the context of the present example, an image received from a camera, which may be a video camera or a still image camera, is passed to a DNN for facial quality prediction at block 302 in which a face quality score is generated. At decision block 304, if the face quality score is greater than a predetermined or configurable threshold (e.g., 0.5), then processing continues with block 306; otherwise, processing branches to lock 310 at which the image is discarded or archived. As those skilled in the art will appreciate, the face quality score may be less than the threshold as a result of different reasons. For example, the image may not contain a human face or despite containing a human face, the face may be unrecognizable due to the face being ill posed and/or sever blurring. Depending on the end purpose of the face recognition, the threshold value may be adjusted. For example, if face recognition is part of an authentication system, a high threshold may be used. In an embodiment, the threshold can also vary depending on the environment from which the image was received. When the face quality score is greater than a threshold, the system performs facial feature extraction at block 306 using the DNN. The system performs facial feature extraction 306 to retrieve patterns from image data that are used to recognize a human face. The patterns represent the relationship between the input data features and the output target to be predicted. For example, a multi-dimensional feature vector representing the facial features may translated to low-dimensional space. The process of translating the multi-dimensional feature vector to low-dimensional space is called embedding. Facial features extracted from the image and represented in the form of a feature vector may be further used for face recognition at block 308.

Figure 4B:
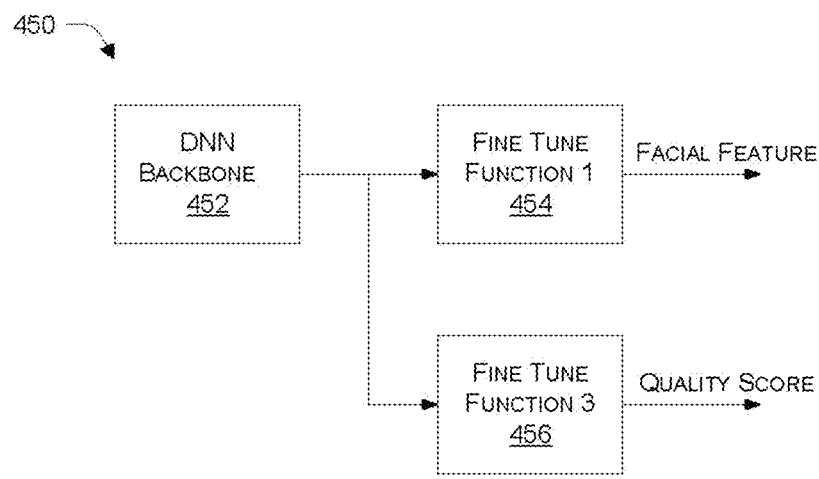
FIG. 4B illustrates a DNN architecture having a common DNN backbone for jointly predicting a quality score and for performing facial feature extraction in accordance with an embodiment of the present disclosure.

FIG. 4B illustrates a DNN architecture 450 having a common DNN backbone (e.g., DNN backbone 452) for jointly predicting a quality score and for performing facial feature extraction in accordance with an embodiment of the present disclosure. In the context of the present example, the output from the common DNN backbone of the DNN is supplied further to a branch of the DNN trained for facial feature extraction and another branch of the DNN for quality score prediction. As shown in FIG. 4B, fine-tuned function-1 454 (e.g., a facial feature extraction algorithm) and fine-tuned function-2 456 (e.g., a face quality prediction algorithm) can be used for facial feature extraction and quality score prediction, respectively.

According to one embodiment, the face recognition system trains the common DNN backbone to jointly perform both facial feature extraction and quality score prediction by first training the common DNN backbone and the facial feature extraction algorithm to perform facial feature extraction based on a first training dataset and then fixing the common DNN backbone while training the face quality prediction algorithm based on a second training dataset (e.g., a custom-labeled training dataset).

It has been observed that the intermediate output of the common DNN backbone (which also serves as an input to the facial image quality prediction branch) is highly correlated with features that are good for face recognition and/or facial image quality prediction. As such, in accordance with various embodiments, the face recognition system is thus designed to leverage the common DNN backbone for jointly perform facial feature extraction and prediction of a facial quality score for an image at issue. By sharing the common DNN backbone, the face recognition system proposed herein can reduce CPU and memory consumption by up to 50%. Since the common DNN backbone is trained for the facial feature extraction algorithm, the input to the quality fine-tuning layer is more correlated to facial features, which in turn results in better facial quality score prediction. It has been observed through experimentation that the facial quality score predicted by the facial recognition system of the present disclosure is much more accurate than existing models.

Figure 5:
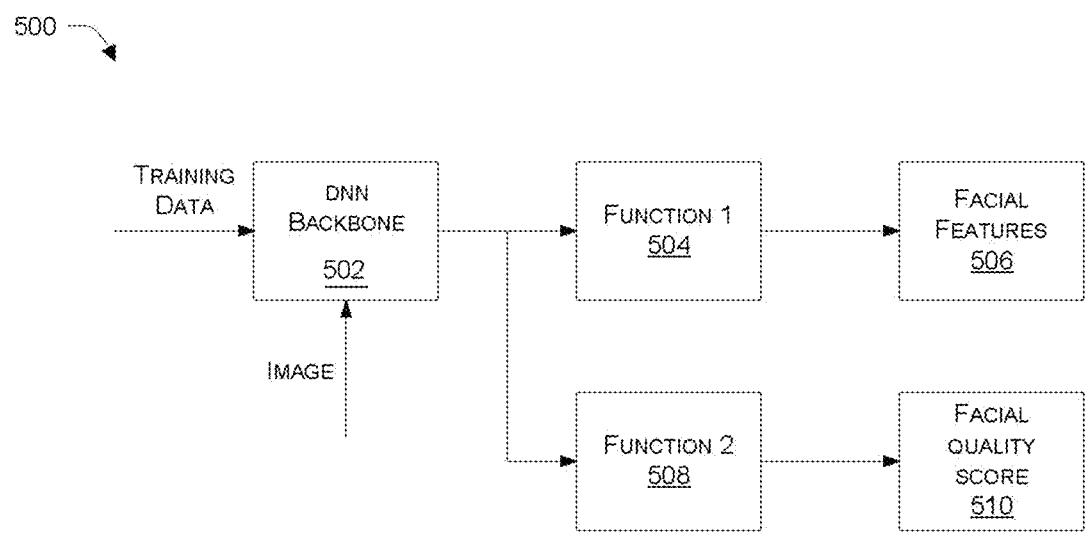
FIG. 5 illustrates functional blocks of a DNN and their arrangement to perform facial recognition in accordance with an embodiment of the present disclosure.

FIG. 5 illustrates functional blocks of a DNN 500 and their arrangement to perform facial recognition in accordance with an embodiment of the present disclosure. In training mode, a shared DNN backbone (e.g., DNN backbone 502) and a first branch of the DNN 500 (e.g., function 1 504) are first trained based on training data (e.g., a first training dataset) to output facial features 506. Then, while holding the shared DNN backbone fixed, a second branch of the DNN 500 (e.g., function 2 508) may be trained based on different training data (e.g., a second training dataset) to generate a facial quality score 510. Once trained, the DNN 500 may receive an image and generate intermediate patterns using the shared DNN backbone that can be used for extracting facial feature 506 and predicting the facial quality score 510.

Figure 6:
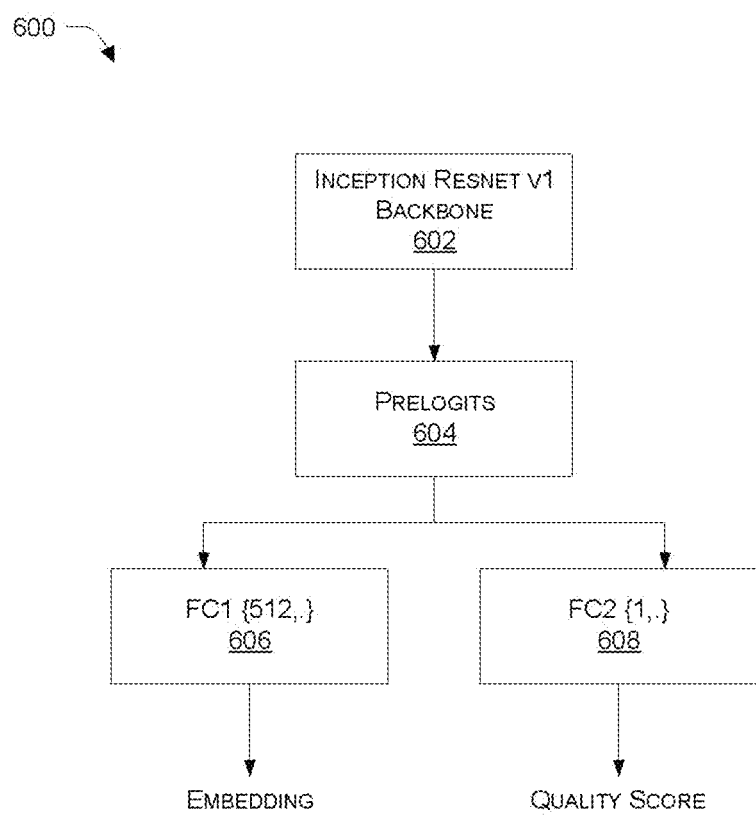
FIG. 6 illustrates an example of common prelogits used for facial feature extraction and quality prediction in accordance with an embodiment of the present disclosure.

FIG. 6 illustrates an example of prelogits 604 used for facial feature extraction and quality prediction in accordance with an embodiment of the present disclosure. In an example implementation, an Inception ResNet v1 backbone 602 can be used to implement the common DNN backbone (e.g., DNN backbone 452 or DNN 502). As shown in FIG. 6, the backbone 602 may generate prelogits, which can be further used by FC1 606 designed to extract a facial feature embedding and FC2 608 designed to predict a quality score. According to one embodiment, prelogits 604 output represents a fully connected layer. Specific branches after this may lead to different outputs (e.g., feature embedding or quality score prediction).

FIG. 7 illustrates a custom labeling scheme that may be used to tag a custom training dataset 700 in accordance with an embodiment of the present disclosure. As shown in FIG. 7, the custom training dataset 700 may be categorized into multiple categories (e.g., 3 to 6). The training dataset may have been manually classified. Each category may be assigned a score depending on how suitable images of the respective category are for face recognition. According to one embodiment, the set of categories included within the custom-labeled training dataset includes six categories having integer scores between 0 to 5, inclusive (which may be normalized to during inference processing to floating point values between 0 and 1, inclusive).

A first category (e.g., category 710) may include a first subset of the example/training images representative of those of the training images for which a facial feature extraction algorithm cannot be performed. The first category can be described as non-face images and labeled with a score of 0.

A second category (e.g., category 720) may include a second subset of the training images for which the facial feature extraction algorithm may be performed, but with a high likelihood of poor results. The second category may be described as those of the training images containing an unrecognizable face even for someone familiar with the person whose face is present and may be labeled with a score of 1.

A third category (e.g., category 730) may include a third subset of the training images or which the facial feature extraction algorithm may be performed, but with a lower likelihood of poor results than the second category. The third category may be described as those of the training images containing a severely blurred, but still recognizable face or containing faces that may be differentiated by a person familiar with the persons whose faces are present and may be labeled with a score of 2.

A fourth category (e.g., category 740) may include a fourth subset of the training images or which the facial feature extraction algorithm may be performed, with a high likelihood of suitable results. The fourth category may be described as those of the training images containing a blurred or low resolution image blurred, but still recognizable face or containing faces that may be differentiated by even persons unfamiliar with the persons whose faces are present and may be labeled with a score of 3.

A fifth category (e.g., category 750) may include a fifth subset of the training images or which the facial feature extraction algorithm may be performed with a higher likelihood of suitable results that the fourth category. The fifth category may be described as those of the training images containing a minor blurred and/or ill-posed face (i.e., a facial orientation or a head pose having greater than 45 degrees of pitch (nodding), roll (tilting) and yaw (shaking) defined with respect to three Euler angles around three axes based on the positioning of various facial landmarks, for example, the left eye, the right eye, the nose, the left mouth, the right mouth, and the chin) and may be labeled with a score of 4.

A sixth category (e.g., category 760) may include a sixth subset of the example images representative of those of the training images that are ideal for the facial feature extraction algorithm. The sixth category may be described as those of the training images containing a sharp, clear, and good-posed face (i.e., the facial orientation or the head pose has less than or equal to 45 degrees of pitch (nodding), roll (tilting) and yaw (shaking)) and may be labeled with a score of 5.

While in the context of the present example, six categories of images are shown, more or fewer categories may be used and combined in various ways; however, those skilled in the art will appreciate as the number of categories increases, the machine learning model (e.g., DNN) may face the issue of class imbalance and more training data may be required as compared to a training dataset with fewer categories. According to one embodiment, the custom-labeled training dataset 700 may be grouped into three categories by maintaining categories 710 and 760 and combining categories 720, 730, 740, and 750 into a third category. Similarly, in one embodiment, the custom-labeled training dataset 700 may be grouped into four categories by maintaining categories 710 and 760 and combining categories 720 and 730 into a third category and combining categories 740 and 750 into a fourth category.

Figure 8A:
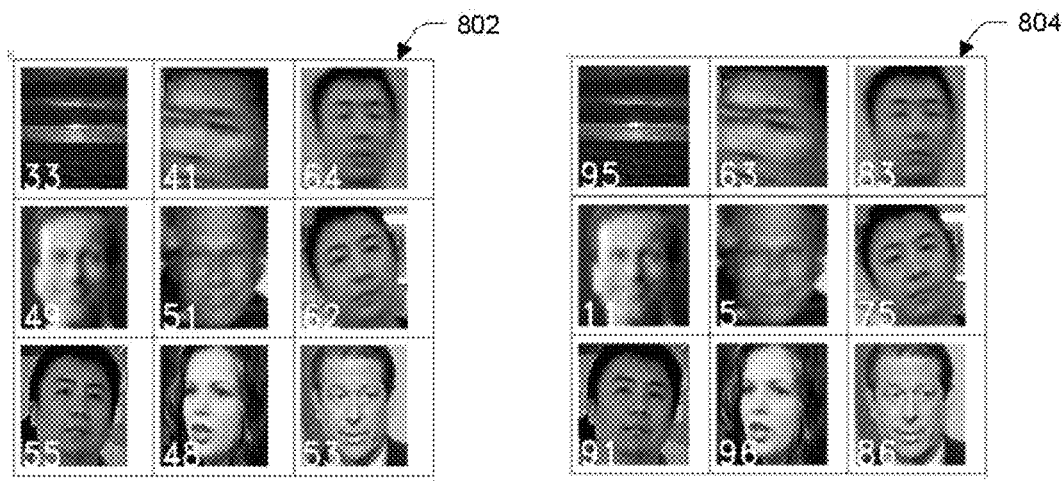
FIG. 8A illustrates example scores for facial quality generated by existing face recognition systems.

FIG. 8A illustrates an example scoring of images for facial quality by existing face recognition systems. As shown in FIG. 8A, results 802 illustrate quality scores generated by the FaceQNET algorithm, which predicts a score of 31 for an image of an evening sun having no human face and a score of 48 for an image that can easily be recognized. The model predicts a face quality score of 51 for an image that is blurred. Results 804 illustrate quality scores generated by the BRISQUE algorithm, which scores the image of the evening sun as a 95, having a score close to a score 96 of a clean image containing a face that is easy to recognize. A blurred image is assigned a score of 63. The scores clearly indicate the deficiency of existing ML models used to predict the facial quality score.

Figure 8B:
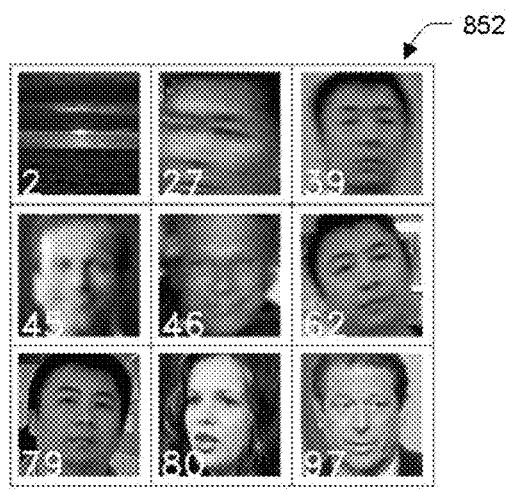
FIG. 8B illustrates example scores of images generated in accordance with an embodiment of the present disclosure.

FIG. 8B illustrates an example scoring of images in accordance with an embodiment of the present disclosure. Facial quality prediction scores 852 are generated using the DNN model trained with a training dataset labeled using a custom-labeled training dataset similar to that depicted in FIG. 7. Based on the results achieved, those skilled in the art will appreciate, the prediction scores of the proposed model is very accurate. An image of the sun that does not contain a face is scored as a 2, a blurred image is scored as a 27 as it contains a face but is unrecognizable, and three images of the last row that have clean faces are scored 70, 80, and 97, respectively.

The various functional components, engines, and modules (e.g., the facial quality prediction modules 106, 156, and 206, the facial feature extraction modules 108, 158, and 208, the neural network training module 204, the face recognition module 210, the DNN backbone 452 and 502, function 1 504, and function 2 508) and other functional units described herein and the processing described below with reference to the flow diagrams of FIGS. 9A-B may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 10 below.

Figure 9A:
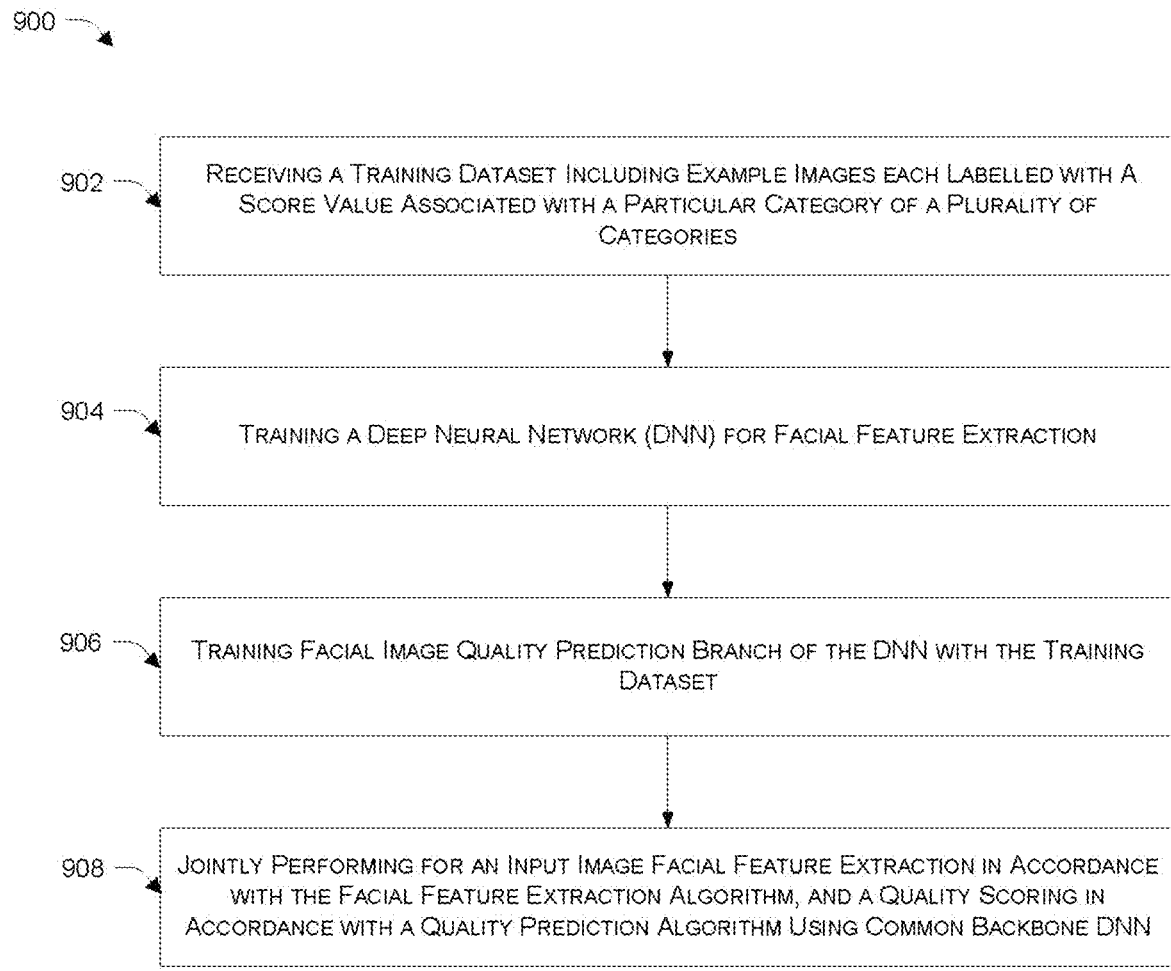
FIG. 9A is a flow diagram illustrating a process of training a DNN in accordance with an embodiment of the present disclosure.

FIG. 9A is a flow diagram 900 illustrating a process of training a DNN in accordance with an embodiment of the present disclosure. In the context of the present example, the DNN architecture is assumed to be similar to that depicted in FIG. 4B in which a facial feature extraction algorithm and a facial quality score prediction algorithm share a common DNN backbone (e.g., DNN backbone 452). At block 902, a training dataset (e.g., a custom-labeled training dataset) is received that includes training/example images labelled with a score value associated with a particular category of a plurality of categories (e.g., some subset of the categories described with reference to FIG. 7).

At block 904, a DNN is trained for performing facial feature extraction. In one embodiment, a facial feature extraction algorithm and the common DNN backbone shared by both the facial feature extraction algorithm and a facial image quality prediction algorithm is trained for performing facial feature extraction based on a training dataset that is different from the custom-labeled training dataset.

At block 906, the facial image quality prediction branch of the DNN is trained with the custom-labeled dataset (e.g., custom-labeled dataset 700). In one embodiment, the common DNN backbone is held fixed as the facial image quality prediction algorithm is trained based on the custom-labeled dataset.

At block 908, facial feature extraction and quality scoring are jointly performed for an input image in accordance with the facial feature extraction algorithm and the quality prediction algorithm, respectively, based on the common DNN backbone.

Figure 9B:
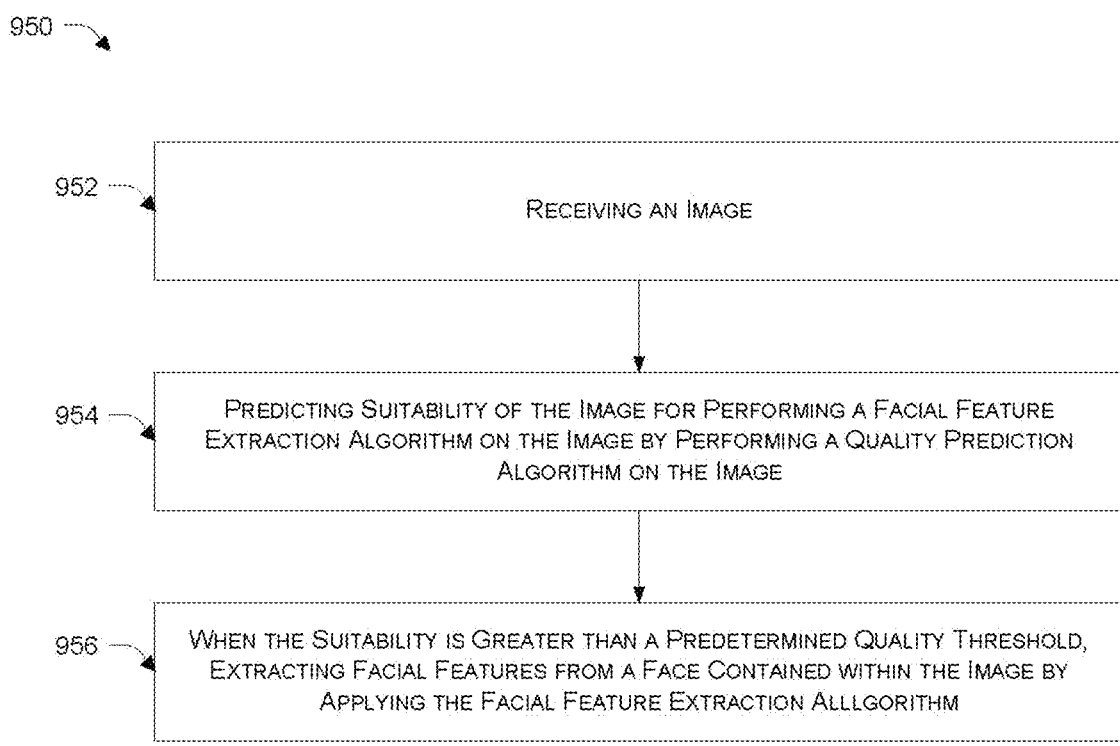
FIG. 9B is a flow diagram illustrating a process of face recognition configured to use a common DNN backbone for face quality prediction and facial feature extraction in accordance with an embodiment of the present disclosure.

FIG. 9B is a flow diagram 950 illustrating a process of face recognition configured to use a common DNN backbone for face quality prediction and facial feature extraction in accordance with an embodiment of the present disclosure. Process 950 includes the steps of receiving an image as shown at block 952, predicting the suitability of the image for performing a facial feature extraction algorithm on the image by performing a quality prediction algorithm on the image as shown at block 954 and extracting facial features from a face contained within the image by applying the facial feature extraction algorithm, when the suitability is greater than a predetermined quality threshold, as shown at block 956. The quality prediction algorithm and the facial feature extraction algorithm are jointly performed by a deep neural network (DNN) that has been trained based on a training dataset (e.g., custom-labeled training dataset, such as custom-labeled training dataset 700 of FIG. 7) including example images, each labeled with a score value associated with a particular category of a set of categories. The facial feature extraction algorithm and the quality prediction algorithm share a common DNN backbone of the DNN.

Figure 10:
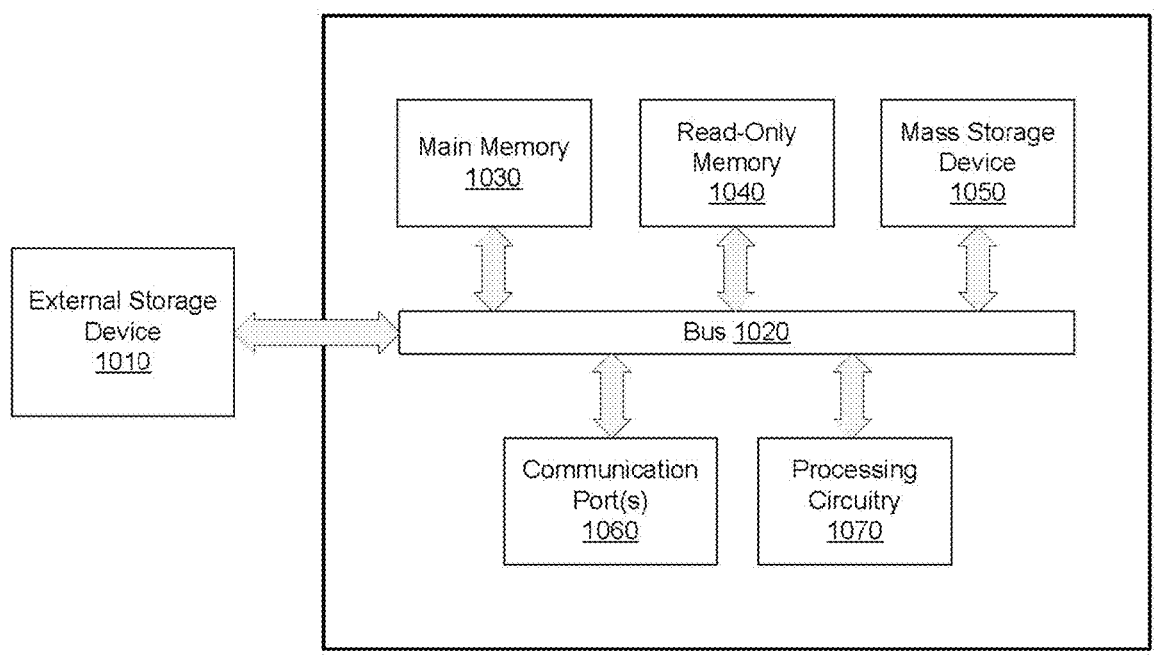
FIG. 10 illustrates an exemplary computer system in which or with which embodiments of the present disclosure may be utilized.

FIG. 10 illustrates an exemplary computer system 1000 in which or with which embodiments of the present disclosure may be utilized. As shown in FIG. 10, the computer system includes an external storage device 1040, a bus 1030, a main memory 1020, a read-only memory 1020, a mass storage device 1025, one or more communication ports 1010, and one or more processing resources (e.g., processing circuitry 1005). In one embodiment, computer system 1000 may represent some portion of a camera (e.g., camera 116*a-n*), a surveillance system (e.g., surveillance system 102), or a face recognition system (e.g., face recognition system 104 or 154).

Those skilled in the art will appreciate that computer system 1000 may include more than one processing resource and communication port 1010. Non-limiting examples of processing circuitry 1005 include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processor 1070 may include various modules associated with embodiments of the present disclosure.

Communication port 1010 can be any of an RS-232 port for use with a modem-based dialup connection, a 10/100 Ethernet port, a Gigabit, 10 Gigabit, 25 G, 40 G, and 100 G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 1015 can be Random Access Memory (RAM), or any other dynamic storage device commonly known in the art. Read only memory 1020 can be any static storage device(s) e.g., but not limited to, a Programmable Read Only Memory (PROM) chips for storing static information e.g. start-up or BIOS instructions for the processing resource.

Mass storage 1025 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1030 communicatively couples processing resource (s) with the other memory, storage and communication blocks. Bus 1030 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 1030 to support direct operator interaction with computer system. Other operator and administrative interfaces can be provided through network connections connected through communication port 1060. External storage device 604 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the exemplary hardware, software, processes, methods, and/or operating systems described herein are for illustrative purposes and, thus, are not intended to be limited to any particular named. While the foregoing describes various embodiments of the disclosure, other and further embodiments may be devised without departing from the basic scope thereof.

What is claimed is:

1. A method performed by one or more processing resources of a computer system, the method comprising:
   providing a deep neural network (DNN) implementing a facial feature extraction algorithm and a quality prediction algorithm that share a common DNN backbone of the DNN; and
   training the DNN to jointly perform (i) facial feature extraction in accordance with the facial feature extraction algorithm and (ii) a quality score in accordance with the quality prediction algorithm by:
      training the common DNN backbone and the facial feature extraction algorithm based on a first training dataset including a plurality of training images, wherein the training the common DNN backbone and the facial feature extraction algorithm based on the first training data set yields an intermediate output of the common DNN backbone that is correlated to facial quality; and
      training the quality prediction algorithm based on a second training dataset and the intermediate output of the common DNN backbone while holding fixed the common DNN backbone, wherein the second training dataset includes example images each labeled with a score value associated with a particular category of a plurality of categories, wherein a first category of the plurality of categories includes a first subset of the example images representative of those of the example images for which a facial feature extraction algorithm cannot be performed, wherein a second category of the plurality of categories includes a second subset of the example images representative of those of the example images that are ideal for the facial feature extraction algorithm, and wherein a third category of the plurality of categories includes a third subset of the example images representative of those of the example images having a suitability for the facial feature extraction algorithm between that of the first category and the second category.

2. The method of claim 1, wherein the plurality of categories comprises three categories.

3. The method of claim 1, wherein the third subset of the example images comprise images containing an unrecognizable face.

4. The method of claim 1, wherein the third subset of the example images comprise images each containing a face that is recognizable, but which is difficult to differentiate except by someone familiar with the face.

5. The method of claim 1, wherein the third subset of the example images comprise images each containing a face that is easily recognizable and capable of differentiation by someone unfamiliar with the face despite the images being low resolution or the face being blurred.

6. The method of claim 1, wherein the third subset of the example images comprise images each containing a face that is easy to recognize despite the images having minor blur or an ill-posed nature of the face.

7. The method of claim 1, wherein the plurality of categories comprises six categories.

8. A method performed by one or more processing resources of a computer system, the method comprising:
   receiving an image;
   predicting a suitability of the image for performing a facial feature extraction algorithm on the image by performing a quality prediction algorithm on the image;
   when the suitability is greater than a predetermined quality threshold, extracting facial features from a face contained within the image by applying the facial feature extraction algorithm;
   wherein the quality prediction algorithm and the facial feature extraction algorithm are jointly performed by a deep neural network (DNN) that has been trained by:
      training a common DNN backbone and the facial feature extraction algorithm based on a first training dataset including a plurality of training images, wherein the training the common DNN backbone and the facial feature extraction algorithm based on the first training data set yields an intermediate output of the common DNN backbone that is correlated to facial quality; and
      training the quality prediction algorithm based on a second training dataset and the intermediate output of the common DNN backbone while holding fixed the common DNN backbone;
   wherein the facial feature extraction algorithm and the quality prediction algorithm share a common DNN backbone of the DNN;
   wherein a first category of the plurality of categories includes a first subset of the example images representative of those of the example images for which the facial feature extraction algorithm cannot be performed;
   wherein a second category of the plurality of categories includes a second subset of the example images representative of those of the example images that are ideal for the facial feature extraction algorithm; and wherein a third category of the plurality of categories includes a third subset of the example images representative of those of the example images having a suitability for the facial feature extraction algorithm between that of the first category and the second category.

9. The method of claim 8, wherein the image is extracted from a plurality of video frames generated by a video camera.

10. The method of claim 9, wherein the computer system is part of a surveillance system.

11. A non-transitory computer-readable storage medium embodying a set of instructions, which when executed by one or more processing resources of a computer system, causes the one or more processing resources to perform a method comprising:

training a deep neural network (DNN) implementing a facial feature extraction algorithm and a quality prediction algorithm that share a common DNN backbone of the DNN to jointly perform (i) facial feature extraction in accordance with the facial feature extraction algorithm and (ii) a quality score in accordance with the quality prediction algorithm by:

training the common DNN backbone and the facial feature extraction algorithm based on a first training dataset including a plurality of training images, wherein the training the common DNN backbone and the facial feature extraction algorithm based on the first training data set yields an intermediate output of the common DNN backbone that is correlated to facial quality; and training the quality prediction algorithm based on a second training dataset and the intermediate output of the common DNN backbone while holding fixed the common DNN backbone, wherein the second training dataset includes example images each labeled with a score value associated with a particular category of a plurality of categories, wherein a first category of the plurality of categories includes a first subset of the example images representative of those of the example images for which a facial feature extraction algorithm cannot be performed, wherein a second category of the plurality of categories includes a second subset of the example images representative of those of the example images that are ideal for the facial feature extraction algorithm, and wherein a third category of the plurality of categories includes a third subset of the example images representative of those of the example images having a suitability for the facial feature extraction algorithm between that of the first category and the second category.

12. A non-transitory computer-readable storage medium embodying a set of instructions, which when executed by one or more processing resources of a computer system, causes the one or more processing resources to perform a method comprising:

receiving an image;

predicting a suitability of the image for performing a facial feature extraction algorithm on the image by performing a quality prediction algorithm on the image;

when the suitability is greater than a predetermined quality threshold, extracting facial features from a face contained within the image by applying the facial feature extraction algorithm;

wherein the quality prediction algorithm and the facial feature extraction algorithm are jointly performed by a deep neural network (DNN) that has been trained by:

training a common DNN backbone and the facial feature extraction algorithm based on a first training dataset including a plurality of training images, wherein the training the common DNN backbone and the facial feature extraction algorithm based on the first training data set yields an intermediate output of the common DNN backbone that is correlated to facial quality; and training the quality prediction algorithm based on a second training dataset and the intermediate output of the common DNN backbone while holding fixed the common DNN backbone;

wherein the facial feature extraction algorithm and the quality prediction algorithm share a common DNN backbone of the DNN;

wherein a first category of the plurality of categories includes a first subset of the example images representative of those of the example images for which the facial feature extraction algorithm cannot be performed;

wherein a second category of the plurality of categories includes a second subset of the example images representative of those of the example images that are ideal for the facial feature extraction algorithm; and wherein a third category of the plurality of categories includes a third subset of the example images representative of those of the example images having a suitability for the facial feature extraction algorithm between that of the first category and the second category.

13. A system comprising:

a processing resource;

a non-transitory computer-readable medium, coupled to the processing resource, having stored therein instructions that when executed by the processing resource cause the processing resource to:

train a deep neural network (DNN) implementing a facial feature extraction algorithm and a quality prediction algorithm that share a common DNN backbone of the DNN to jointly perform (i) facial feature extraction in accordance with the facial feature extraction algorithm and (ii) a quality score in accordance with the quality prediction algorithm by:

training the common DNN backbone and the facial feature extraction algorithm based on a first training dataset including a plurality of training images, wherein the training the common DNN backbone and the facial feature extraction algorithm based on the first training data set yields an intermediate output of the common DNN backbone that is correlated to facial quality; and training the quality prediction algorithm based on a second training dataset and the intermediate output of the common DNN backbone while holding fixed the common DNN backbone, wherein the second training dataset includes example images each labeled with a score value associated with a particular category of a plurality of categories, wherein a first category of the plurality of categories includes a first subset of the example images representative of those of the example images for which a facial feature extraction algorithm cannot be performed, wherein a second category of the plurality of categories includes a second subset of the example images representative of those of the example images that are ideal for the facial feature extraction algorithm, and wherein a third category of the plurality of categories includes a third subset of the example images representative of those of the example images having a suitability for the facial feature extraction algorithm between that of the first category and the second category.

14. The system of claim 13, wherein the third subset of the example images comprise images containing an unrecognizable face.

15. The system of claim 13, wherein the third subset of the example images comprise images each containing a face that is recognizable, but which is difficult to differentiate except by someone familiar with the face.

16. The system of claim 13, wherein the third subset of the example images comprise images each containing a face that is easily recognizable and capable of differentiation by someone unfamiliar with the face despite the images being low resolution or the face being blurred.

17. The system of claim 13, wherein the third subset of the example images comprise images each containing a face that is easy to recognize despite the images having minor blur or an ill-posed nature of the face.

18. A system comprising:
a processing resource;
a non-transitory computer-readable medium, coupled to the processing resource, having stored therein instructions that when executed by the processing resource cause the processing resource to:
receive an image;
predict a suitability of the image for performing a facial feature extraction algorithm on the image by performing a quality prediction algorithm on the image;
when the suitability is greater than a predetermined quality threshold, extracting facial features from a face contained within the image by applying the facial feature extraction algorithm;
wherein the quality prediction algorithm and the facial feature extraction algorithm are jointly performed by a deep neural network (DNN) that has been trained by:
training a common DNN backbone and the facial feature extraction algorithm based on a first training dataset including a plurality of training images, wherein the training the common DNN backbone and the facial feature extraction algorithm based on the first training data set yields an intermediate output of the common DNN backbone that is correlated to facial quality; and
training the quality prediction algorithm based on a second training dataset and the intermediate output of the common DNN backbone while holding fixed the common DNN backbone;
wherein the facial feature extraction algorithm and the quality prediction algorithm share a common DNN backbone of the DNN;
wherein a first category of the plurality of categories includes a first subset of the example images representative of those of the example images for which the facial feature extraction algorithm cannot be performed;
wherein a second category of the plurality of categories includes a second subset of the example images representative of those of the example images that are ideal for the facial feature extraction algorithm; and
wherein a third category of the plurality of categories includes a third subset of the example images representative of those of the example images having a suitability for the facial feature extraction algorithm between that of the first category and the second category.

19. The system of claim 18, wherein the image is extracted from a plurality of video frames generated by a video camera.

20. The system of claim 19, wherein the system comprises or is part of a surveillance system.

* * * * *